United States Patent
Martinez Franco et al.

(10) Patent No.: US 10,941,045 B1
(45) Date of Patent: Mar. 9, 2021

(54) PROCESS FOR PREPARING AN IZM-2 ZEOLITE IN THE PRESENCE OF A NITROGENOUS ORGANIC STRUCTURING AGENT IN HYDROXIDE FORM AND OF AN ALKALI METAL CHLORIDE, IN FLUORINATED OR NON-FLUORINATED MEDIUM

(71) Applicant: IFP Energies nouvelles, Rueil-Malmaison (FR)

(72) Inventors: Raquel Martinez Franco, Rueil-Malmaison (FR); Monique Prigent, Rueil-Malmaison (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 0 days.

(21) Appl. No.: 17/032,093

(22) Filed: Sep. 25, 2020

(30) Foreign Application Priority Data

Sep. 26, 2019 (FR) .................... 19/10.619

(51) Int. Cl.
*C01B 39/48* (2006.01)
*B01J 29/70* (2006.01)

(52) U.S. Cl.
CPC .......... *C01B 39/48* (2013.01); *B01J 29/70* (2013.01); *C01P 2002/72* (2013.01); *C01P 2006/80* (2013.01)

(58) Field of Classification Search
CPC ....... C01B 39/48; B01J 29/70; C01P 2002/72; C01P 2006/80
See application file for complete search history.

(56) References Cited

U.S. PATENT DOCUMENTS

2010/0272624 A1* 10/2010 Fecant ............... B01J 20/10
423/327.1
2012/0022279 A1* 1/2012 Cabiac ............... C07C 11/02
554/167
(Continued)

FOREIGN PATENT DOCUMENTS

EP 3378831 A1 * 9/2018 .......... B01J 29/70

OTHER PUBLICATIONS

Mota et al."IZM-2: A promising new zeolite for the selective hydroisomerization of long-chainn-alkanes" Journal of Catalysis 301 (2013) 20-29 (Year: 2013).*
(Continued)

*Primary Examiner* — David M Brunsman
(74) *Attorney, Agent, or Firm* — Millen, White, Zelano and Branigan, P.C.

(57) ABSTRACT

The invention relates to a process for preparing an IZM-2 zeolite, comprising at least:
i) mixing, in aqueous medium, of at least one source of at least one tetravalent element X ($XO_2$), at least one source of at least one trivalent element Y ($Y_2O_3$), 1,6-bis(methylpiperidinium)hexane dihydroxide, at least one source of at least one alkali metal M of valency n chosen from alkali metal chlorides, n being an integer greater than or equal to 1, M being chosen from lithium, potassium, sodium and caesium, and the mixture of at least two of these metals, and optionally in the presence of a source of at least one fluoride anion, BF, the mixture having a specific molar composition to obtain a homogeneous precursor gel;
ii) hydrothermal treatment of said precursor gel.

10 Claims, 1 Drawing Sheet

(56) References Cited

U.S. PATENT DOCUMENTS

| | | | | |
|---|---|---|---|---|
| 2013/0115163 A1* | 5/2013 | Weston | ............... | C01B 39/04 |
| | | | | 423/704 |
| 2015/0087841 A1* | 3/2015 | Weston | ............... | C01B 39/04 |
| | | | | 546/137 |
| 2018/0273391 A1* | 9/2018 | Martinez Franco | ..... | B01J 29/70 |

OTHER PUBLICATIONS

Li et al, "Microporous pure-silica IZM-2" Microporous and Mesoporous Materials 237 (2017) 222e227223 (Year: 2017).*

* cited by examiner

PROCESS FOR PREPARING AN IZM-2 ZEOLITE IN THE PRESENCE OF A NITROGENOUS ORGANIC STRUCTURING AGENT IN HYDROXIDE FORM AND OF AN ALKALI METAL CHLORIDE, IN FLUORINATED OR NON-FLUORINATED MEDIUM

TECHNICAL FIELD

The present invention relates to a novel process for preparing a microporous crystalline solid, known as IZM-2 microporous solid or IZM-2 zeolite. This novel process makes it possible to perform the synthesis of an IZM-2 zeolite in the presence of a specific organic or structuring species including two quaternary ammonium functions. In particular, said novel process makes it possible to perform the synthesis of an IZM-2 zeolite both in fluorinated medium and in non-fluorinated medium, starting with at least one source of silicon, at least one source of aluminium, at least one source of at least one alkali metal M of valency n chosen from alkali metal chlorides and a specific organic or structuring molecule including two quaternary ammonium functions, 1,6-bis(methylpiperidinium)hexane dihydroxide. Said IZM-2 microporous solid obtained according to the process of the invention advantageously finds its application as a catalyst, adsorbent or separating agent.

PRIOR ART

Crystalline microporous materials, such as zeolites or silicoaluminophosphates, are solids that are extensively used in the petroleum industry as catalysts, catalytic supports, and adsorbents or separating agents. Although many microporous crystalline structures have been discovered, the refining and petrochemical industry is constantly in search of novel zeolitic structures which have particular properties for applications such as the purification or separation of gases, the conversion of carbon-based species or the like.

IZM-2 zeolite is a solid having an unknown structure. Model reactions were employed (meta-xylene isomerization and dismutation and n-decane isomerization-hydrocracking) for the purpose of predicting the topology of the IZM-2 microporous material (Fecant et al. in J. Catal., 20, (2013) 20-29). The results obtained for these reactions suggest that the structure of the IZM-2 material consists of two types of pore sizes (10-MR and 12-MR).

IZM-2 zeolite was synthesized in its aluminosilicate form (Fecant et al. FR2918050 A1) and in its purely silicic form (Fecant et al. FR2918050 A1 and Li et al. in Microporous Mesoporous Mater., 237 (2017) 222-227), using the quaternary ammonium ion 1,6-bis(methylpiperidinium)hexane as structuring agent, in its hydroxide or bromide form. In these documents, the synthesis consists in performing a hydrothermal treatment of an aqueous gel containing a source of silicon, a structuring agent (1,6-bis(methylpiperidinium) hexane) and optionally a source of amorphous aluminium, and optionally a source of an alkali metal and/or alkaline-earth metal (NaOH).

Recently, IZM-2 zeolite has been prepared using a zeolite of FAU framework type as source of silicon and of aluminium (Martinez Franco et al. FR 3064262 A1, FR 3064261 A1).

In patent application FR 3064262 A1, the synthesis consists in performing a hydrothermal treatment of an aqueous gel containing a zeolite of FAU framework type as source of silicon and of aluminium, optionally an additional source of $SiO_2$, a specific structuring agent, (1,6-bis(methylpiperidinium)hexane) bromide, a source of an alkali metal and/or alkaline-earth metal (preferably NaOH) and optionally a source of at least one fluoride anion, BF.

In patent application FR 3064261 A1, the synthesis consists in performing a hydrothermal treatment of an aqueous gel containing a zeolite of FAU framework type as source of silicon and of aluminium, optionally an additional source of $SiO_2$, a specific structuring agent, (1,6-bis(methylpiperidinium)hexane) dihydroxide, and a source of at least one fluoride anion, BF, and optionally in the presence of a source of an alkali metal, preferably NaOH.

The subject of the present invention is a novel process for preparing a synthetic IZM-2 zeolite, which consists in performing a hydrothermal treatment of an aqueous gel containing a source of silicon and a source of amorphous aluminium, a specific structuring agent, (1,6-bis(methylpiperidinium)hexane) in its dihydroxide form, in combination with a source of a specific alkali metal chloride M (preferably NaCl), in fluorinated or non-fluorinated medium.

Thus, the Applicant has discovered that the nitrogenous or structuring organic compound including two quaternary ammonium functions, 1,6-bis(methylpiperidinium)hexane dihydroxide, mixed in the presence of at least one source of silicon, of at least one source of aluminium and optionally of other sources of at least one trivalent element and/or of at least one tetravalent element, of at least one source of at least one alkali metal M of valency n, chosen from alkali metal chlorides, n being an integer greater than or equal to 1, in the presence or absence of a source of at least one fluoride anion, leads to the production of a precursor gel of an IZM-2 zeolite of very high purity. Any other crystalline or amorphous phase is generally and very preferentially absent from the crystalline solid consisting of the IZM-2 zeolite obtained on conclusion of the preparation process.

SUMMARY OF THE INVENTION

In particular, the invention relates to a process for preparing an IZM-2 zeolite, comprising at least the following steps:

i) mixing, in aqueous medium, of at least one source of at least one tetravalent element X in oxide form $XO_2$, at least one source of at least one trivalent element in oxide form $Y_2O_3$, a nitrogenous organic compound $R(OH)_2$, which is 1,6-bis(methylpiperidinium)hexane dihydroxide, at least one source of at least one alkali metal M of valency n chosen from alkali metal chlorides, n being an integer greater than or equal to 1, M being chosen from lithium, potassium, sodium and caesium, and the mixture of at least two of these metals, and optionally in the presence of at least one fluoride anion, BF, the reaction mixture having the following molar composition:

$XO_2/Y_2O_3$ between 70 and 350 and preferably between 80 and 300

$H_2/XO_2$ between 1 and 100 and preferably between 5 and 50

$R(OH)_2/XO_2$ between 0.006 and 0.25 and preferably between 0.01 and 0.20

$M_{1/n}Cl/XO_2$ between 0.005 and 0.5 and preferably between 0.01 and 0.4

$BF/XO_2$ between 0 and 0.25 and preferably between 0 and 0.2, with X being chosen from silicon, germanium and titanium, and a mixture of at least two of these tetravalent elements, and X preferably being silicon, Y being chosen from aluminium, boron, iron, indium and gallium, and the mixture of at least two of these trivalent elements, and Y preferably being aluminium, until a homogeneous precursor gel is obtained; and BF being chosen from fluorine salts in which B is a cation chosen from the cations $NH_4^+$, $Na^+$, $K^+$ and $Li^+$, and hydrofluoric acid in aqueous solution, ii) hydrothermal treatment of said precursor gel obtained on conclusion of step i) at a temperature of between 120° C. and 220° C., for a time of between 1 day and 10 days.

The present invention thus lies in the preparation of a precursor gel of an IZM-2 zeolite, in the presence of fluorinated or non-fluorinated anions, by means of the combination of a specific organic or structuring species, including two quaternary ammonium functions, 1,6-bis(methylpiperidinium)hexane dihydroxide, with a source of a specific alkali metal M, alkali metal chloride (preferably sodium chloride), said process being performed under specific operating conditions, notably in terms of hydrothermal treatment time.

One advantage of the present invention is that it provides a novel preparation process for forming a pure IZM-2 zeolite. Any other crystalline or amorphous phase is generally and very preferentially absent from the crystalline solid consisting of the IZM-2 zeolite obtained on conclusion of the preparation process.

Another advantage of the present invention is that it allows the preparation of an IZM-2 zeolite with an $SiO_2/Al_2O_3$ ratio of between 70 and 350 and preferably between 80 and 300.

DETAILED DESCRIPTION OF THE INVENTION

In accordance with the invention, the mixing step i) is performed in aqueous medium, by mixing at least one source of at least one tetravalent element X in oxide form $XO_2$, at least one source of at least one trivalent element in oxide form $Y_2O_3$, a nitrogenous organic compound $R(OH)_2$, which is 1,6-bis(methylpiperidinium)hexane dihydroxide, at least one source of at least one alkali metal M of valency n chosen from alkali metal chlorides, n being an integer greater than or equal to 1, with M being chosen from lithium, potassium, sodium and caesium, and the mixture of at least two of these metals, and optionally in the presence of at least one fluoride anion, BF, the reaction mixture having the following molar composition:

$XO_2/Y_2O_3$ between 70 and 350 and preferably between 80 and 300

$H_2O/XO_2$ between 1 and 100 and preferably between 5 and 50

$R(OH)_2/XO_2$ between 0.006 and 0.25 and preferably between 0.01 and 0.20

$M_{1/n}Cl/XO_2$ between 0.005 and 0.5 and preferably between 0.01 and 0.4

$BF/XO_2$ between 0 and 0.25 and preferably between 0 and 0.2,

X being chosen from silicon, germanium and titanium, and a mixture of at least two of these tetravalent elements, and X preferably being silicon, Y being chosen from aluminium, boron, iron, indium and gallium, and a mixture of at least two of these trivalent elements, and Y preferably being aluminium, until a homogeneous precursor gel is obtained; and BF being chosen from fluorine salts in which B is a cation chosen from the cations $NH_4^+$, $Na^+$, $K^+$ and $Li^+$, and hydrofluoric acid in aqueous solution.

The mixture of step i) may also comprise one or more tetravalent elements X other than silicon, chosen from the group formed by the following elements: germanium, titanium and/or the mixture may also comprise one or more trivalent elements Y, other than aluminium, chosen from the group formed by the following elements: iron, boron, indium and gallium.

In the molar composition of the above reaction mixture and throughout the description:

$XO_2$ denotes the molar amount of the tetravalent element (s) expressed in oxide form, and $Y_2O_3$ denotes the molar amount of the trivalent element(s) expressed in oxide form, $H_2O$ the molar amount of water present in the reaction mixture, $R(OH)_2$ the molar amount of said nitrogenous organic compound, $M_{1/n}Cl$ the molar amount expressed in the form of $M_{1/n}Cl$ of the source of alkali metal present in the form of alkali metal chloride.

BF the molar amount expressed in the form BF of the source of fluorinated anions.

In accordance with the invention, at least one source of at least one oxide $XO_2$ is incorporated into the mixture to perform step (i) of the preparation process, X being one or more tetravalent elements chosen from the group formed by the following elements: silicon, germanium, titanium, X preferably being silicon.

When X is silicon, the source(s) of said tetravalent element(s) may be any compound comprising the element X and which can release this element in aqueous solution in reactive form.

The source of silicon may be any one of said sources commonly used for zeolite synthesis, for example powdered silica, silicic acid, colloidal silica, dissolved silica or tetraethoxysilane (TEOS). Among the powdered silicas, use may be made of precipitated silicas, especially those obtained by precipitation from a solution of alkali metal silicate, fumed silicas, for example Cab-O-Sil, and silica gels. Colloidal silicas having various particle sizes, for example a mean equivalent diameter of between 10 and 15 nm or between 40 and 50 nm may be used, such as those sold under registered brand names such as Ludox. Preferably, the source of silicon is Ludox HS-40.

When X is titanium, $Ti(EtO)_4$ is advantageously used as source of titanium.

In accordance with the invention, at least one source of at least one oxide $Y_2O_3$ is incorporated into the mixture to perform said step (i) of the preparation process according to the invention, Y being one or more trivalent elements chosen from the group formed by the following elements: aluminium, iron, boron, indium and gallium, and at least one of the trivalent elements Y being aluminium.

The source of aluminum is preferably aluminium hydroxide or an aluminum salt, for example the chloride, nitrate or sulfate, a sodium aluminate, an aluminium alkoxide, or alumina itself, preferably in hydrated or hydratable form, for instance colloidal alumina, pseudoboehmite, gamma-alumina or alpha or beta alumina trihydrate. Use may also be made of mixtures of the sources mentioned above.

In accordance with the invention, R is a nitrogenous organic compound, 1,6-bis(methylpiperidinium)hexane, said compound being incorporated into the reaction mixture to perform step (i), as organic structuring agent. The anion associated with the quaternary ammonium cations present in the structuring organic species for the synthesis of an IZM-2 zeolite according to the invention is the hydroxide anion (OH⁻).

In accordance with the invention, at least one source of at least one alkali metal M of valency n chosen from alkali metal chlorides, is used in the reaction mixture of step i), n being an integer greater than or equal to 1, M preferably being chosen from lithium, potassium, sodium and caesium, and a mixture of at least two of these metals. Preferably, M is sodium.

Very preferably, the source of at least one alkali metal M is sodium chloride.

In the mixing step i), sodium hydroxide NaOH is not used as source of at least one alkali metal.

In accordance with the invention, at least one source of at least one fluoride anion termed BF may optionally be added to said reaction mixture of step i), BF being chosen from hydrofluoric acid in aqueous solution and fluorine salts in which B is a cation chosen from the cations $NH_4^+$, $Na^+$, $K^+$ and $Li^+$, and a mixture of at least two of these salts. Preferably, BF is a fluorine salt in which B is the $NH_4^+$ cation. Thus, the source of at least one fluoride anion is preferably $NH_4F$ in aqueous solution.

According to the invention, the mixing step i) may be performed in the presence or absence of fluoride anions. The molar amount, expressed in the form BF, of the source of fluorinated anions in the molar composition of the reaction mixture of step i) is such that: $BF/XO_2$ between 0 and 0.25 and preferably between 0 and 0.2.

In a preferred embodiment, it may be advantageous to add seeds of an IZM-2 zeolite to the reaction mixture during said step i) of the process of the invention so as to reduce the time required for the formation of the crystals of an IZM-2 zeolite and/or the total crystallization time. Said seed crystals also promote the formation of said IZM-2 zeolite to the detriment of impurities. Such seeds comprise crystalline solids, notably crystals of an IZM-2 zeolite. The seed crystals are generally added in a proportion of between 0.01% and 10% of the total mass of the sources of said tetravalent and trivalent element(s) in anhydrous form used in the reaction mixture, said seed crystals not being taken into account in the total mass of the sources of the tetravalent and trivalent elements. Said seeds are not taken into account either for determining the composition of the reaction mixture and/or of the gel, defined above, i.e. in the determination of the various mole ratios of the composition of the reaction mixture.

The mixing step i) is performed until a homogeneous mixture is obtained, preferably for a time of more than or equal to 30 minutes, preferably with stirring by any system known to those skilled in the art, at a low or high shear rate.

On conclusion of step i), a homogeneous precursor gel is obtained.

Advantageously, the precursor gel obtained on conclusion of step i) has a mole ratio of the total amount expressed as oxides of tetravalent elements to the total amount expressed as oxides of trivalent elements of between 80 and 300.

In the case where X=Si and Y=Al, the precursor gel obtained on conclusion of step i) has an $SiO_2/Al_2O_3$ mole ratio of between 80 and 300.

According to one embodiment, it may be advantageous to perform maturation, during step i), of the reaction mixture obtained on conclusion of step i) and before the hydrothermal crystallization step ii) so as to control the size of the crystals of an IZM-2 zeolite. Said maturation also promotes the formation of said IZM-2 zeolite to the detriment of impurities. Maturation of the reaction mixture obtained on conclusion of said step i) of the process of the invention may be performed at room temperature or at a temperature of between 20 and 100° C. with or without stirring, for a time advantageously between 30 minutes and 48 hours.

In accordance with the invention, the process comprises a step ii) which consists of hydrothermal treatment of said precursor gel obtained on conclusion of step i) at a temperature of between 120° C. and 220° C., for a time of between 1 day and 10 days.

Step ii) of hydrothermal treatment of said precursor gel is performed until said IZM-2 zeolite crystallizes.

The precursor gel is advantageously placed under hydrothermal conditions at an autogenous reaction pressure, optionally with addition of gas, for example nitrogen, at a temperature of between 120° C. and 220° C., preferably between 150° C. and 195° C., until an IZM-2 zeolite has fully crystallized.

The time required to obtain crystallization ranges between 1 day and 10 days, preferably between 2 days and 8 days.

Step ii) of hydrothermal treatment of said precursor gel is preferably performed with stirring or without stirring, preferably with stirring. The stirring system that may be used is any system known to those skilled in the art, for example inclined paddles with counter-blades, stirring turbomixers or endless screws.

At the end of the reaction, after performing said step ii) of the preparation process according to the invention, the solid phase formed from an IZM-2 zeolite is preferably filtered, washed and then dried. The drying is generally performed at a temperature of between 20° C. and 150° C., preferably between 60° C. and 100° C., for a time of between 5 and 24 hours.

The dried zeolite may then advantageously be calcined. The calcined IZM-2 zeolite is generally analysed by X-ray diffraction, this technique also making it possible to determine the purity of said zeolite obtained via the process of the invention.

Very advantageously, the process of the invention leads to the formation of an IZM-2 zeolite, free of any other crystalline or amorphous phase. Said IZM-2 zeolite, after the drying step, is then ready for the subsequent steps such as calcining and ion exchange. For these steps, any conventional method known to those skilled in the art may be employed.

The step of calcining an IZM-2 zeolite obtained according to the process of the invention is preferentially performed at a temperature of between 450 and 700° C. for a time of between 2 and 20 hours, the calcining possibly being preceded by a gradual temperature increase.

The IZM-2 zeolite obtained on conclusion of the calcining step is free of any organic species and in particular of the organic structuring agent $R(OH)_2$.

On conclusion of said calcining step, X-ray diffraction makes it possible to confirm that the solid obtained via the process according to the invention is indeed an IZM-2 zeolite. The purity obtained is advantageously greater than 90%, preferably greater than 95% and very preferably greater than 99.8% by weight. The solid obtained has the X-ray diffraction pattern which includes at least the lines recorded in Table 1. Preferably, the X-ray diffraction pattern does not contain any other lines of significant intensity (i.e. with an intensity of about three times the background noise) than those recorded in Table 1.

This diffraction pattern is obtained by radiocrystallographic analysis by means of a diffractometer using the conventional powder method with the Kα1 radiation of copper (λ=1.5406 Å). On the basis of the position of the diffraction peaks represented by the angle 2θ, the interplanar spacings dhkl characteristic of the sample are calculated using the Bragg relationship. The measurement error $\Delta(d_{hkl})$ on dhkl is calculated by means of the Bragg relationship as a function of the absolute error $\Delta(2\theta)$ assigned to the measurement of 2θ. An absolute error $\Delta(2\theta)$ equal to ±0.02° is commonly accepted. The relative intensity Irel assigned to each value of dhkl is measured from the height of the corresponding diffraction peak. The X-ray pattern of the IZM-2 crystalline solid according to the invention includes at least the lines at the values of dhkl given in Table 1. The column of the dhkl values gives the mean values of the interplanar spacings in Angströms (Å). Each of these values must be assigned the measurement error $\Delta(d_{hkl})$ of between ±0.6 Å and 0.01 Å.

TABLE 1

Mean values of $d_{hkl}$ and relative intensities measured on an X-ray diffraction pattern of the IZM-2 crystalline solid

| 2 theta (°) | dhkl (Å) | Irel |
|---|---|---|
| 7.26 | 12.17 | m |
| 7.65 | 11.56 | m |
| 8.71 | 10.14 | mw |
| 12.09 | 7.31 | vw |
| 14.77 | 5.99 | vw |
| 15.25 | 5.81 | vw |
| 18.06 | 4.91 | vw |
| 18.95 | 4.68 | vw |
| 21.14 | 4.19 | VS |
| 22.29 | 3.98 | w |
| 23.55 | 3.85 | m |
| 24.47 | 3.78 | vw |
| 26.72 | 3.64 | vw |
| 29.39 | 3.33 | vw |
| 33.02 | 3.04 | vw |
| 36.62 | 2.45 | vw |
| 44.56 | 2.03 | vw |
| 49.04 | 1.86 | vw | where VS=very strong; S=strong; m=moderate; mw=moderately weak; w=weak; vw=very weak. The relative intensity Irel is given as a relative intensity scale in which a value of 100 is attributed to the most intense line in the X-ray diffraction diagram: vw<15; 15≤w<30; 30≤mw<50; 50≤m<65; 65≤S<85; VS≥85.

It is also advantageous to obtain the protonated form of the IZM-2 zeolite obtained via the process according to the invention. Said protonated form may be obtained by performing an ion exchange with an acid, in particular a strong mineral acid such as hydrochloric, sulfuric or nitric acid, or with a compound such as ammonium chloride, sulfate or nitrate. The ion exchange step may be performed by placing said IZM-2 zeolite in suspension one or more times with the ion-exchange solution. Said zeolite may be calcined before or after the ion exchange or between two ion-exchange steps. The zeolite is preferably calcined before the ion exchange, so as to remove any organic substance included in the porosity of the zeolite, since the ion exchange is thereby facilitated.

The IZM-2 zeolite obtained via the process of the invention may be used after ion exchange as acidic solid for catalysis in the fields of refining and petrochemistry. It may also be used as an adsorbent or as a molecular sieve.

The process according to the invention allows the production of an IZM-2 zeolite advantageously having an $SiO_2/Al_2O_3$ ratio of between 70 and 350, preferably between 80 and 300 in the case where X=Si, and Y=Al.

The following analytical techniques are used to determine the $SiO_2/Al_2O_3$ ratio of the zeolite obtained:

X-ray fluorescence spectrometry (XFS) is a chemical analysis technique using a physical property of matter, X-ray fluorescence. It enables the analysis of the majority of the chemical elements starting from beryllium (Be) in concentration ranges ranging from a few ppm to 100%, with precise and reproducible results. X-rays are used to excite the atoms in a sample, which makes them emit X-rays having an energy characteristic of each element present. The intensity and the energy of these X-rays are then measured to determine the concentration of the elements in the material.

Inductively-coupled plasma mass spectrometry (ICP) is a chemical analysis technique for measuring radiation emitted by excited or ionized atoms. To be excited, the sample is injected into an argon plasma at very high temperatures (8000 K). At this temperature, the sample undergoes fusion, vaporization, ionization and thermal excitation. The light emitted by the excited ions is detected and measured by an optical emission spectrometer (OES).

Figure 1:
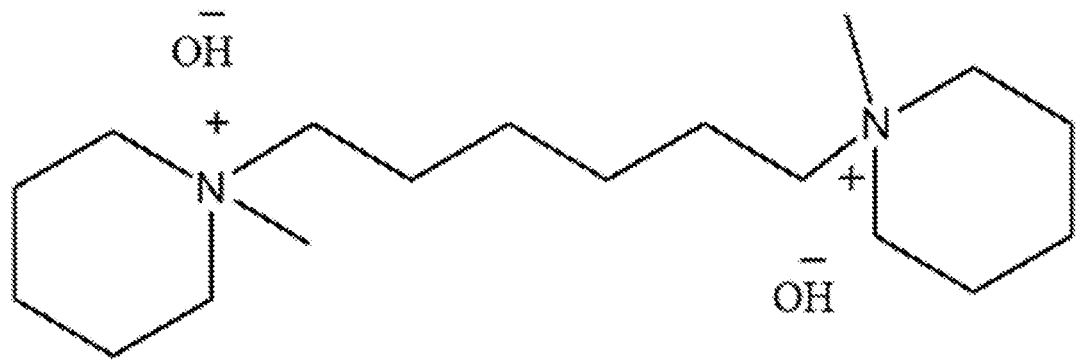
FIG. 1 represents the chemical formula of 1,6-bis(methylpiperidinium)hexane dihydroxide chosen as structuring agent in the synthetic process according to the invention.

Other characteristics and advantages of the synthetic process according to the invention will become apparent on reading the following description of non-limiting exemplary embodiments with reference to the appended figures described below.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 19/10.619, filed Sep. 26, 2019, are incorporated by reference herein.

EXAMPLES

Example 1: Preparation of 1,6-bis(methylpiperidinium)hexane dihydroxide [R(OH)$_2$]

50 g of 1,6-dibromohexane (0.20 mol, 99%, Alfa Aesar) are placed in a 1 L round-bottomed flask containing 50 g of N-methylpiperidine (0.51 mol, 99%, Alfa Aesar) and 200 mL of ethanol. The reaction medium is stirred at reflux for 5 hours. The mixture is then cooled to room temperature and then filtered. The mixture is poured into 300 mL of cold diethyl ether and the precipitate formed is then filtered off and washed with 100 mL of diethyl ether. The solid obtained is recrystallized from an ethanol/ether mixture. The solid obtained is dried under vacuum for 12 hours. 71 g of a white solid are obtained (i.e. a yield of 80%).

The product has the expected 1H NMR spectrum. 1H NMR (D2O, ppm/TMS): 1.27 (4H, m); 1.48 (4H, m); 1.61 (4H, m); 1.70 (8H, m); 2.85 (6H, s); 3.16 (12H, m). 18.9 g of Ag2O (0.08 mol, 99%, Aldrich) are placed in a 250 ml Teflon beaker containing 30 g of the structuring agent 1,6-bis(methylpiperidinium) dibromide (0.07 mol) prepared according to Example 1 and 100 ml of deionized water. The reaction medium is stirred for 12 hours in the absence of light. The mixture is then filtered. The filtrate obtained is composed of an aqueous solution of 1,6-bis(methylpiperidinium)hexane dihydroxide. Assay of this species is performed by proton NMR using formic acid as standard.

Example 2: Preparation of an IZM-2 Solid According to the Invention 3.486 g of an aqueous solution of 1,6-bis(methylpiperidinium)hexane dihydroxide (18.36% by weight) prepared according to Example 1 were mixed with 1.434 g of deionized water. 0.427 g of sodium chloride (solid, purity of 99% by weight, Alfa Aesar) is added to the preceding mixture, and the preparation obtained is kept stirring for 10 minutes. 0.009 g of amorphous aluminium hydroxide gel (amorphous $Al(OH)_3$ gel, 58.55% $Al_2O_3$, Merck) is then incorporated and the synthetic gel is kept stirring for 15 minutes. 1.828 g of colloidal silica (Ludox HS40, 40% by weight, Aldrich) are incorporated into the mixture, which is kept stirring for 15 minutes. Finally, 0.866 g of aqueous ammonium fluoride solution (10% by weight) is incorporated into the synthetic mixture, which is kept stirring for 30 minutes to evaporate off the solvent until the composition of the desired precursor gel is obtained, i.e. a molar composition of the following mixture: 60 $SiO_2$: 0.25 $Al_2O_3$: 10 $R(OH)_2$: 9.6 NaCl: 1770 $H_2O$: 10 $NH_4F$, i.e. an $SiO_2/Al_2O_3$ ratio for the gel obtained of 240. The precursor gel is then transferred, after homogenization, into an autoclave. The autoclave is closed and then heated for 8 days at 170° C. with stirring at 32 rpm with a rotary spit system. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

Figure 2:
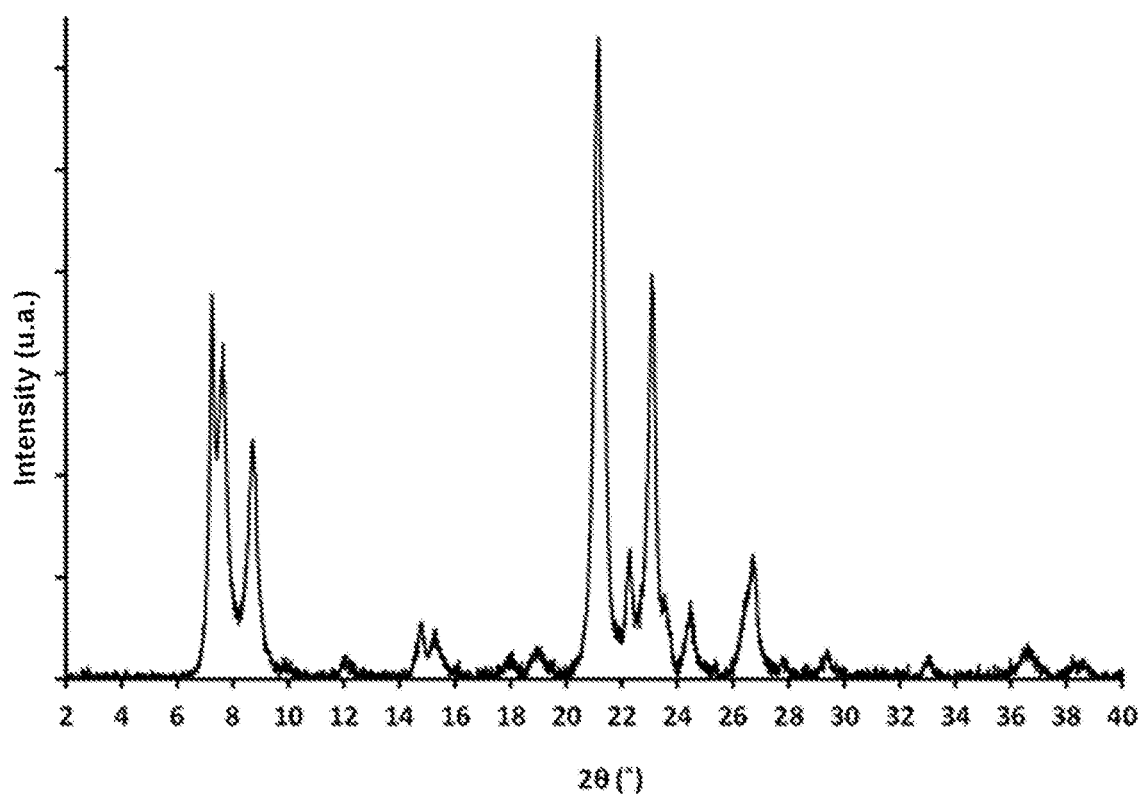
FIG. 2 represents the X-ray diffraction pattern of the IZM-2 zeolite obtained according to Example 2.

The calcined solid product was analysed by X-ray diffraction and identified as consisting of an IZM-2 zeolite with a purity of greater than 99.8%. The diffraction pattern produced for the calcined IZM-2 microporous solid is given in FIG. 2.

Example 3: Preparation of an IZM-2 Solid According to the Invention 43.564 g of an aqueous solution of 1,6-bis(methylpiperidinium)hexane dihydroxide (18.36% by weight) prepared according to Example 1 were mixed with 26.721 g of deionized water. 5.328 g of sodium chloride (solid, purity of 99% by weight, Alfa Aesar) is added to the preceding mixture, and the preparation obtained is kept stirring for 10 minutes. 0.111 g of amorphous aluminium hydroxide gel (amorphous $Al(OH)_3$ gel, 58.55% $Al_2O_3$, Merck) is then incorporated and the synthetic gel is kept stirring for 15 minutes. 22.773 g of colloidal silica (Ludox HS40, 40% by weight, Aldrich) are incorporated into the mixture, which is kept stirring for 15 minutes. Finally, 10.854 g of aqueous ammonium fluoride solution (10% by weight) are incorporated into the synthetic mixture, which is kept stirring for 30 minutes to evaporate off the solvent until the composition of the desired precursor gel is obtained, i.e. a molar composition of the following mixture: 60 $SiO_2$: 0.25 $Al_2O_3$: 10 $R(OH)_2$: 9.6 NaCl: 1770 $H_2O$: 10 $NH_4F$, i.e. an $SiO_2/Al_2O_3$ ratio for the gel of 240. The precursor gel is then transferred into a 1000 mL stainless-steel reactor equipped with a stirring system with four inclined paddles. The reactor is closed and then heated for 8 days at 170° C. with stirring at 350 rpm. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analysed by X-ray diffraction and identified as consisting of an IZM-2 zeolite with a purity of greater than 99.8%. The IZM-2 zeolite obtained has an $SiO_2/Al_2O_3$ mole ratio of 222.3 as determined by X-ray fluorescence and ICP.

Example 4: Preparation of an IZM-2 Solid According to the Invention 3.522 g of an aqueous solution of 1,6-bis(methylpiperidinium)hexane dihydroxide (18.36% by weight) prepared according to Example 1 were mixed with 1.619 g of deionized water. 0.194 g of sodium chloride (solid, purity of 99% by weight, Alfa Aesar) is added to the preceding mixture, and the preparation obtained is kept stirring for 10 minutes. 0.01 g of amorphous aluminium hydroxide gel (amorphous $Al(OH)_3$ gel, 58.55% $Al_2O_3$, Merck) is then incorporated and the synthetic gel is kept stirring for 15 minutes. 1.837 g of colloidal silica (Ludox HS40, 40% by weight, Aldrich) are incorporated into the mixture, which is kept stirring for 15 minutes. Finally, 0.863 g of aqueous ammonium fluoride solution (10% by weight) are incorporated into the synthetic mixture, which is kept stirring for 30 minutes to evaporate off the solvent until the composition of the desired precursor gel is obtained, i.e. a molar composition of the following mixture: 60 $SiO_2$: 0.25 $Al_2O_3$: 10 $R(OH)_2$: 4.8 NaCl: 1770 $H_2O$: 10 $NH_4F$, i.e. an $SiO_2/Al_2O_3$ ratio of 240. The precursor gel is then transferred, after homogenization, into an autoclave. The autoclave is closed and then heated for 8 days at 170° C. with stirring at 32 rpm with a rotary spit system. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analysed by X-ray diffraction and identified as consisting of an IZM-2 zeolite with a purity of greater than 99.8%.

Example 5: Preparation of an IZM-2 Solid According to the Invention 39.497 g of an aqueous solution of 1,6-bis(methylpiperidinium)hexane dihydroxide (18.36% by weight) prepared according to Example 1 were mixed with 26.011 g of deionized water. 2.273 g of sodium chloride (solid, purity of 99% by weight, Alfa Aesar) are added to the preceding mixture, and the preparation obtained is kept stirring for 10 minutes. 0.102 g of amorphous aluminium hydroxide gel (amorphous Al(OH)$_3$ gel, 58.55% Al$_2$O$_3$, Merck) is then incorporated and the synthetic gel is kept stirring for 15 minutes. 20.618 g of colloidal silica (Ludox HS40, 40% by weight, Aldrich) are incorporated into the mixture, which is kept stirring for 15 minutes. Finally, 9.727 g of aqueous ammonium fluoride solution (10% by weight) are incorporated into the synthetic mixture, which is kept stirring for 30 minutes to evaporate off the solvent until the composition of the desired precursor gel is obtained, i.e. a molar composition of the following mixture: 60 SiO$_2$: 0.25 Al$_2$O$_3$: 10 R(OH)$_2$: 4.8 NaCl: 1770 H$_2$O: 10 NH$_4$F, i.e. an SiO$_2$/Al$_2$O$_3$ ratio of 240. The precursor gel is then transferred into a 160 mL stainless-steel reactor equipped with a stirring system with four inclined paddles. The reactor is closed and then heated for 8 days at 170° C. with stirring at 350 rpm. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analysed by X-ray diffraction and identified as consisting of an IZM-2 zeolite with a purity of greater than 99.8%. The product has an SiO$_2$/Al$_2$O$_3$ mole ratio of 212.8 as determined by X-ray fluorescence and ICP.

Example 6: Preparation of an IZM-2 Solid According to the Invention 3.473 g of an aqueous solution of 1,6-bis(methylpiperidinium)hexane dihydroxide (18.36% by weight) prepared according to Example 1 are mixed with 1.819 g of deionized water. 0.921 g of sodium chloride (solid, purity of 99% by weight, Alfa Aesar) are added to the preceding mixture, and the preparation obtained is kept stirring for 10 minutes. 0.009 g of amorphous aluminium hydroxide gel (amorphous Al(OH)$_3$ gel, 58.55% Al$_2$O$_3$, Merck) is then incorporated and the synthetic gel is kept stirring for 15 minutes. Finally, 1.808 g of colloidal silica (Ludox HS40, 40% by weight, Aldrich) are incorporated into the synthesis mixture, which is kept stirring for 30 minutes to evaporate off the solvent until the desired precursor gel composition is obtained, i.e. a molar composition of the following mixture: 60 SiO$_2$: 0.25 Al$_2$O$_3$: 10 R(OH)$_2$: 20 NaCl: 1770 H$_2$O, i.e. an SiO$_2$/Al$_2$O$_3$ ratio of 240. The precursor gel is then transferred, after homogenization, into an autoclave. The autoclave is closed and then heated for 6 days at 170° C. with stirring at 32 rpm with a rotary spit system. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analysed by X-ray diffraction and identified as consisting of an IZM-2 zeolite with a purity of greater than 99.8%.

Example 7: Preparation of an IZM-2 Solid According to the Invention 3.496 g of an aqueous solution of 1,6-bis(methylpiperidinium)hexane dihydroxide (18.36% by weight) prepared according to Example 1 are mixed with 2.020 g of deionized water. 0.681 g of sodium chloride (solid, purity of 99% by weight, Alfa Aesar) is added to the preceding mixture, and the preparation obtained is kept stirring for 10 minutes. 0.009 g of amorphous aluminium hydroxide gel (amorphous Al(OH)$_3$ gel, 58.55% Al$_2$O$_3$, Merck) is then incorporated and the synthetic gel is kept stirring for 15 minutes. Finally, 1.835 g of colloidal silica (Ludox HS40, 40% by weight, Aldrich) are incorporated into the synthesis mixture, which is kept stirring for 30 minutes to evaporate off the solvent until the desired precursor gel composition is obtained, i.e. a molar composition of the following mixture: 60 SiO$_2$: 0.25 Al$_2$O$_3$: 10 R(OH)$_2$: 15 NaCl: 1770 H$_2$O, i.e. an SiO$_2$/Al$_2$O$_3$ ratio of 240. The precursor gel is then transferred, after homogenization, into an autoclave. The autoclave is closed and then heated for 6 days at 170° C. with stirring at 32 rpm with a rotary spit system. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analysed by X-ray diffraction and identified as consisting of an IZM-2 zeolite with a purity of greater than 99.8%.

Example 8: Preparation of an IZM-2 Solid According to the Invention 1.831 g of an aqueous solution of 1,6-bis(methylpiperidinium)hexane dihydroxide (18.36% by weight) prepared according to Example 1 are mixed with 3.578 g of deionized water. 0.722 g of sodium chloride (solid, purity of 99% by weight, Alfa Aesar) is added to the preceding mixture, and the preparation obtained is kept stirring for 10 minutes. 0.011 g of amorphous aluminium hydroxide gel (amorphous Al(OH)$_3$ gel, 58.55% Al$_2$O$_3$, Merck) is then incorporated and the synthetic gel is kept stirring for 15 minutes. Finally, 1.908 g of colloidal silica (Ludox HS40, 40% by weight, Aldrich) are incorporated into the synthesis mixture, which is kept stirring for 30 minutes to evaporate off the solvent until the desired precursor gel composition is obtained, i.e. a molar composition of the following mixture: 60 SiO$_2$: 0.3 Al$_2$O$_3$: 5 R(OH)$_2$: 15 NaCl: 1770 H$_2$O, i.e. an SiO$_2$/Al$_2$O$_3$ ratio of 200. The precursor gel is then transferred, after homogenization, into an autoclave. The autoclave is closed and then heated for 4 days at 170° C. with stirring at 32 rpm with a rotary spit system. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analysed by X-ray diffraction and identified as consisting of an IZM-2 zeolite with a purity of greater than 99.8%.

Example 9: Preparation of an IZM-2 Solid According to the Invention 34.901 g of an aqueous solution of 1,6-bis(methylpiperidinium)hexane dihydroxide (18.36% by weight) prepared according to Example 1 are mixed with 20.085 g of deionized water. 6.799 g of sodium chloride (solid, purity of 99% by weight, Alfa Aesar) are added to the preceding mixture, and the preparation obtained is kept stirring for 10 minutes. 0.125 g of amorphous aluminium hydroxide gel (amorphous $Al(OH)_3$ gel, 58.55% $Al_2O_3$, Merck) is then incorporated and the synthetic gel is kept stirring for 15 minutes. Finally, 18.234 g of colloidal silica (Ludox HS40, 40% by weight, Aldrich) are incorporated into the synthesis mixture, which is kept stirring for 30 minutes to evaporate off the solvent until the desired precursor gel composition is obtained, i.e. a molar composition of the following mixture: 60 $SiO_2$: 0.35 $Al_2O_3$: 10 $R(OH)_2$: 15 NaCl: 1770 $H_2O$, i.e. an $SiO_2/Al_2O_3$ ratio of 171. The precursor gel is then transferred into a 160 mL stainless-steel reactor equipped with a stirring system with four inclined paddles. The reactor is closed and then heated for 4 days at 170° C. with stirring at 350 rpm. The crystalline product obtained is filtered off, washed with deionized water and then dried overnight at 100° C. The solid is then introduced into a muffle furnace where a calcination step is performed: the calcination cycle comprises an increase in temperature of 1.5° C./minute up to 200° C., a steady stage at 200° C. maintained for 2 hours, an increase in temperature of 1° C./minute up to 550° C., followed by a steady stage at 550° C. maintained for 8 hours, then return to room temperature.

The calcined solid product was analysed by X-ray diffraction and identified as consisting of an IZM-2 zeolite with a purity of greater than 99.8%.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Process for preparing an IZM-2 zeolite, comprising at least the following steps:
   i) mixing, in aqueous medium, of at least one source of at least one tetravalent element X in oxide form $XO_2$, at least one source of at least one trivalent element in oxide form $Y_2O_3$, a nitrogenous organic compound $R(OH)_2$, which is 1,6-bis(methylpiperidinium)hexane dihydroxide, at least one source of at least one alkali metal M of valency n chosen from alkali metal chlorides, n being an integer greater than or equal to 1, M being chosen from lithium, potassium, sodium and caesium, and the mixture of at least two of these metals, and optionally in the presence of at least one fluoride anion, BF, the reaction mixture having the following molar composition:
   $XO_2/Y_2O_3$ between 70 and 350,
   $H_2O/XO_2$ between 1 and 100,
   $R(OH)_2/XO_2$ between 0.006 and 0.25,
   $M_{1/n}Cl/XO_2$ between 0.005 and 0.5,
   $BF/XO_2$ between 0 and 0.25,
   with X being one or more tetravalent elements chosen from the group formed by the following elements: silicon, germanium, titanium, at least one element X being silicon, Y is one or more trivalent elements chosen from the group formed by the following elements: aluminium, iron, boron, indium and gallium, and at least one element Y being aluminium, until a homogeneous precursor gel is obtained, and BF being chosen from hydrofluoric acid in aqueous solution and fluorine salts in which B is a cation chosen from the cations $NH_4^+$, $Na^+$, $K^+$ and $Li^+$,
   ii) hydrothermal treatment of said precursor gel obtained on conclusion of step i) at a temperature of between 120° C. and 220° C., for a time of between 1 day and 10 days.

2. Process according to claim 1, in which the mixture of step i) also comprises one or more tetravalent elements X other than silicon, chosen from the group formed by the following elements: germanium, titanium and/or one or more trivalent elements Y, other than aluminium, chosen from the group formed by the following elements: iron, boron, indium and gallium.

3. Process according to claim 1, in which the reaction mixture from step i) has the following molar composition:
   $XO_2/Y_2O_3$ between 80 and 300
   $H_2O/XO_2$ between 5 and 50
   $R(OH)_2/XO_2$ between 0.01 and 0.20
   $M_{1/n}Cl/XO_2$ between 0.01 and 0.4
   $BF/XO_2$ between 0 and 0.2, BF, X, Y, R and M having the abovementioned meaning.

4. Process according to claim 1, in which M is sodium.

5. Process according to claim 1, in which BF is a fluorine salt in which B is the $NH_4^+$ cation.

6. Process according to claim 1, in which the seed crystals of an IZM-2 zeolite are added to the reaction mixture from step i) in an amount of between 0.01% and 10% of the total mass of the sources of said tetravalent and trivalent element(s) in anhydrous form used in the reaction mixture, said seed crystals not being taken into account in the total mass of the sources of the tetravalent and trivalent elements.

7. Process according to claim 1, in which step i) comprises a step of maturing the reaction mixture obtained at a temperature of between 20 and 100° C., with or without stirring, for a time of between 30 minutes and 48 hours.

8. Process according to claim 1, in which the hydrothermal treatment of step ii) is performed under autogenous pressure at a temperature of between 150° C. and 195° C., for a time of between 2 days and 8 days.

9. Process according to claim 8, in which the solid phase obtained on conclusion of step ii) may be filtered, washed and dried at a temperature of between 20 and 150° C., preferably between 60 and 100° C., for a time of between 5 and 24 hours to obtain a dried zeolite.

10. Process according to claim 9, in which the dried zeolite is then calcined at a temperature of between 450 and 700° C. for a time of between 2 and 20 hours, the calcining possibly being preceded by a gradual temperature increase.

* * * * *